United States Patent
Guo

(10) Patent No.: US 10,162,226 B2
(45) Date of Patent: Dec. 25, 2018

(54) PIXEL ELECTRODE AND ARRAY SUBSTRATE

(71) Applicant: Shenzhen China Star Optoelectronics Technology Co., Ltd., Shenzhen (CN)

(72) Inventor: Jinbo Guo, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 14/907,935

(22) PCT Filed: Dec. 14, 2015

(86) PCT No.: PCT/CN2015/097241
§ 371 (c)(1),
(2) Date: Jan. 27, 2016

(87) PCT Pub. No.: WO2017/071016
PCT Pub. Date: May 4, 2017

(65) Prior Publication Data
US 2018/0157075 A1    Jun. 7, 2018

(30) Foreign Application Priority Data

Oct. 27, 2015 (CN) .......................... 2015 1 0706723

(51) Int. Cl.
*G02F 1/1343* (2006.01)
(52) U.S. Cl.
CPC ...... *G02F 1/134309* (2013.01); *G02F 1/1343* (2013.01)
(58) Field of Classification Search
CPC ............. G02F 1/1343; G02F 1/134309; G02F 1/13439; G02F 1/136286; G02F 1/155;
(Continued)

(56) References Cited

U.S. PATENT DOCUMENTS

2007/0279567 A1    12/2007  Matsushima
2009/0002588 A1    1/2009   Lee et al.
(Continued)

FOREIGN PATENT DOCUMENTS

CN    101086592 A    12/2007
CN    102023420 A    4/2011
(Continued)

OTHER PUBLICATIONS

Notification of Transmittal of the International Search Report and the Written Opinion of the International Searching Authority (Forms PCT/ISA/220, PCT/ISA/210, and PCT/ISA/237) dated Jul. 22, 2016, by the State Intellectual Property Office of People's Republic of China in corresponding International Application No. PCT/CN2015/097241. (11 pages).

*Primary Examiner* — Edward Glick
*Assistant Examiner* — Shan Liu
(74) *Attorney, Agent, or Firm* — Buchanan Ingersoll & Rooney PC

(57) ABSTRACT

Disclosed is a pixel electrode and an array substrate. The pixel electrode is divided into four alignment regions, and each of the alignment regions includes two trunk electrodes arranged in a horizontal direction and a vertical direction respectively. The trunk electrode in the vertical direction is located at independent edges of each of the alignment regions. Each of the trunk electrodes has a maximum width at a perpendicular intersecting point of the trunk electrodes. The pixel electrode significantly reduces a dark area inside of a pixel unit and increases transmittance of a pixel.

8 Claims, 4 Drawing Sheets

(58) Field of Classification Search
CPC ...... G02F 1/1393; G02F 1/1395; G02F 1/136;
G02F 1/218; G02F 1/134363; G02F
1/134327; G02F 1/133707; G02F
1/134336; G02F 1/0316; G02F
2001/134318; G02F 2001/134372; G02F
2001/134381; G02F 2001/134345; G02F
2001/1357; G02F 2001/136218; G02F
2001/136295; G02F 2001/1552; G02F
2001/1555; G02F 2001/1557; G02F
2001/13629; G02F 2201/12; G02F
2201/121; G02F 2201/124; G02F
2201/122; G02F 2201/123; G02F
2201/14; G02F 2202/10; G02F 1/133753;
G02F 1/3775; G02F 1/1362; G02F
1/136209; G02F 1/136227; G02F 1/1365;
G02F 1/1368; G02F 1/136222; G02F
1/136231; G02F 1/13625; G02F 1/1635;
H01L 27/124; H01L 27/3276; H01L
27/3297; H01L 27/3279; H01L 27/329;
H01L 23/49534; H01L 2933/0016; H01L
2021/775; H01L 27/1214; H01L 27/2436;
H01L 29/66037; H01L 29/66068; H01L
29/66227; H01L 29/72; H01L 29/786;
H01L 2924/1304; H01L 51/0504; H01L
51/0508; G09G 2300/0421; G09G
2300/0426; G09G 2300/0439

USPC .............................. 349/139–148, 129, 42–43
See application file for complete search history.

(56) References Cited

U.S. PATENT DOCUMENTS

| | | | |
|---|---|---|---|
| 2009/0086149 A1* | 4/2009 | Kim | G02F 1/134363 349/144 |
| 2009/0244467 A1* | 10/2009 | Nomura | G02F 1/134363 349/141 |
| 2011/0063557 A1 | 3/2011 | Kim et al. | |
| 2011/0141414 A1* | 6/2011 | Furukawa | G02F 1/133371 349/113 |
| 2012/0133872 A1 | 5/2012 | Kim et al. | |
| 2013/0010221 A1* | 1/2013 | Yoshida | G02F 1/134363 349/38 |
| 2013/0208225 A1 | 8/2013 | Kwon et al. | |
| 2014/0168593 A1* | 6/2014 | Wang | G02F 1/133707 349/139 |
| 2014/0247409 A1* | 9/2014 | Shin | G09G 3/3659 349/41 |
| 2014/0253853 A1* | 9/2014 | Yoshida | G02F 1/133753 349/123 |
| 2015/0009442 A1* | 1/2015 | Lee | G02F 1/134336 349/43 |
| 2015/0009465 A1* | 1/2015 | Park | G02F 1/133707 349/139 |
| 2016/0033830 A1* | 2/2016 | Park | G02F 1/134336 349/43 |
| 2016/0246135 A1* | 8/2016 | Tae | G02F 1/133753 |
| 2016/0342040 A1* | 11/2016 | Lee | G02F 1/133707 |

FOREIGN PATENT DOCUMENTS

| | | |
|---|---|---|
| JP | 2006-133619 A | 5/2006 |
| JP | 2007-301201 A | 11/2007 |

\* cited by examiner

PIXEL ELECTRODE AND ARRAY SUBSTRATE

CROSS-REFERENCE TO RELATED APPLICATIONS

The present application claims the priority of Chinese patent application CN 201510706723.8, entitled "Pixel electrode and array substrate" and filed on Oct. 27, 2015, the entirety of which is incorporated herein by reference.

FIELD OF THE INVENTION

The present disclosure relates to the field of liquid crystal display technologies, and in particular, to a pixel electrode and an array substrate.

BACKGROUND OF THE INVENTION

A VA-mode liquid crystal display device has the advantages of a large viewing angle, a high contrast, free of friction alignment, and so on, such that VA mode becomes a common display mode for liquid crystal display devices used in large-size TVs. The VA-mode liquid crystal display device generally uses a multi-domain structure to reduce color shift, so that reliable and stable alignment of liquid crystal molecules is the basis for the VA-mode liquid crystal display device to accurately display a picture. At present, alignment of liquid crystal molecules is achieved substantially by cooperation between an electric field and a specially designed pixel electrode.

FIG. 1 schematically shows the structure of a pixel electrode of a VA-mode liquid crystal display device which is generally used in the prior art. As shown in the figure, the pixel electrode includes a cross-shaped trunk electrode and a plurality of branch electrodes intersecting with the trunk electrode at specific angles. The trunk electrode is located at a middle position of the pixel electrode, mainly for connecting the branch electrodes, and the trunk electrode generally has a larger width than the branch electrode, so as to ensure stability of the structure. When a specific gray-scale voltage is applied to the pixel electrode, the liquid crystal molecules, under a combined action of the electric field and the pixel electrode, are deflected from a periphery toward a center of the pixel electrode along directions of the branch electrodes. As the directions of the branch electrodes on the pixel electrode are different, different display domains can be formed.

However, a liquid crystal display device having a pixel electrode with the above-described structure may produce dark areas when an image is displayed. This is because a deflection angle of the liquid crystal molecules located at the trunk electrode is the same as a deflection angle of upper and lower polarizers. Such being the case, transmittance at the trunk electrode is zero, and the dark areas thus occur around the trunk electrode. This affects a display effect of the liquid crystal display device. In particular, when a curved surface is used, dislocation of upper and lower substrates while being bended may widen the dark areas and decrease the transmittance of a pixel unit. This leads to generation of dark areas on a liquid crystal display screen and to deterioration in quality of an image.

To conclude the above, it is in urgent need to improve the structure of the pixel electrode, so as to reduce occurrence of the dark areas.

SUMMARY OF THE INVENTION

One of the technical problems to be solved by the present disclosure is how to improve the structure of a pixel electrode, so as to reduce generation of dark areas.

In order to solve the above technical problem, in an embodiment of the present disclosure, a pixel electrode is provided, which is divided into four alignment regions, and each of the alignment regions includes two perpendicularly intersecting trunk electrodes and a plurality of branch electrodes. The trunk electrodes are arranged along a horizontal direction and a vertical direction respectively, and the trunk electrodes along the vertical direction are located at independent edges of respective alignment regions. The branch electrodes extend radially from a perpendicular intersecting point of the trunk electrodes. Each of the trunk electrodes has a maximum width at the perpendicular intersecting point of the trunk electrodes.

Preferably, the trunk electrodes in the horizontal direction are arranged along boundaries between the alignment regions.

Preferably, no more than two trunk electrodes are arranged along the boundaries between the alignment regions.

Preferably, the four alignment regions are arranged along the vertical direction.

Preferably, along the vertical direction, the branch electrodes of the first alignment region and the second alignment region, and the branch electrodes of the third alignment region and the fourth alignment region form a shape of the letter K, respectively.

Preferably, the trunk electrode gradually decreases in width along an extending direction thereof.

Preferably, the branch electrodes are arranged parallel to each other at equal intervals.

In an embodiment of the present disclosure, an array substrate is further provided, comprising a plurality of pixel units, each of which is provided with one pixel electrode therein, wherein the pixel electrode is divided into four alignment regions, and each of the alignment regions includes two perpendicularly intersecting trunk electrodes and a plurality of branch electrodes. The trunk electrodes are arranged along a horizontal direction and a vertical direction respectively, and the trunk electrodes along the vertical direction are located at independent edges of respective alignment regions. The branch electrodes extend radially from a perpendicular intersecting point of the trunk electrodes. Each of the trunk electrodes has a maximum width at the perpendicular intersecting point of the trunk electrodes.

Preferably, the trunk electrode gradually decreases in width along an extending direction thereof.

Preferably, when two ends of the trunk electrode along the horizontal direction are respectively connected to the trunk electrodes along the vertical direction, width of the trunk electrode along the horizontal direction is largest at positions where the trunk electrode along the horizontal direction connects to the trunk electrodes along the vertical direction, and gradually decreases from the two ends to a middle position of the trunk electrode along the horizontal direction, respectively.

One or more embodiments of the above-described solution may have the following advantages or benefits as compared with the prior art.

The trunk electrodes are preferentially arranged at the edges of the pixel electrode, and the sizes of the trunk electrodes are appropriately increased at the perpendicular intersecting points, so as to significantly reduce the dark areas inside of the pixel unit, thereby improving transmittance of the pixel and improving display quality.

Other advantages, objectives, and features of the present disclosure will be set forth to a certain extent, in the description which follows and, to a certain extent, will be apparent to those skilled in the art based on observational study of the following description, or may be taught from implementation of the present disclosure. The objectives and other advantages of the present disclosure may be realized and obtained by the structure particularly pointed out in the following description, claims, and drawings.

BRIEF DESCRIPTION OF THE DRAWINGS

The following drawings are used to provide further understanding of the technical solution of the present disclosure or of the prior art, and to constitute a part of the description, wherein the drawings expressing the embodiments of the present disclosure serve to interpret the present disclosure together with embodiments of the present disclosure, rather than to limit the technical solution of the present disclosure. In the drawings:

FIGS. 4a and 4b schematically show comparisons of dark areas, wherein FIG. 4a is a diagram of dark areas generated at an edge of the pixel electrode when width of each of the trunk electrodes keeps unchanged, and FIG. 4b is a diagram of dark areas generated at an edge of a pixel electrode used in the embodiment of the present disclosure.

DETAILED DESCRIPTION OF THE EMBODIMENTS

The present disclosure will be explained in detail with reference to the embodiments and the accompanying drawings, whereby it can be fully understood how to solve the technical problem by the technical means according to the present disclosure and achieve the technical effects thereof, and thus the technical solution according to the present disclosure can be implemented. It is important to note that as long as there is no structural conflict, all the technical features mentioned in all the embodiments may be combined together in any manner, and the technical solutions obtained in this manner all fall within the scope of the present disclosure.

The following embodiments are explained with reference to the accompanying drawings, which specifically illustrate implementable embodiments of the present disclosure. Spatial references in the present disclosure, such as "upper," "lower," "left," and "right" indicate respective directions relative to the accompanying drawings. Hence, they are for illustrative purposes only and are not intended to be limiting of the claimed disclosure.

The structures of a pixel electrode according to embodiments of the present disclosure are shown in FIGS. 2a to 2d. The pixel electrode may be further divided into a plurality of alignment regions. Reference can be made to FIG. 3 for the structure of the alignment region. As shown in FIG. 3, an alignment region 30 is in the form of a rectangle, and two trunk electrodes 301 are provided at edges of the alignment region 30. The two trunk electrodes 301 are perpendicularly intersecting at an apex of the rectangular alignment region 30, for supporting and connecting a plurality of branch electrodes 302, which extend radially from a perpendicular intersecting point of the trunk electrodes 301 without exceeding a rectangular area defined by the two trunk electrodes 301. It is to be understood that the present disclosure is not limited to the case in which the four alignment regions are vertically arranged as shown in FIG. 2, but instead, a plurality of alignment regions may be combined in other manners.

Figure 1:
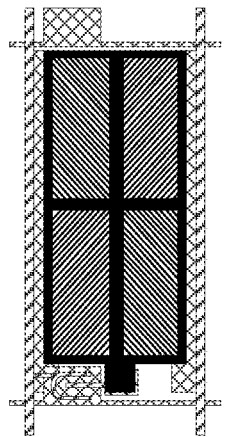
FIG. 1 schematically shows the structure of a pixel electrode of a VA-mode liquid crystal display device in the prior art.
Figure 2A:
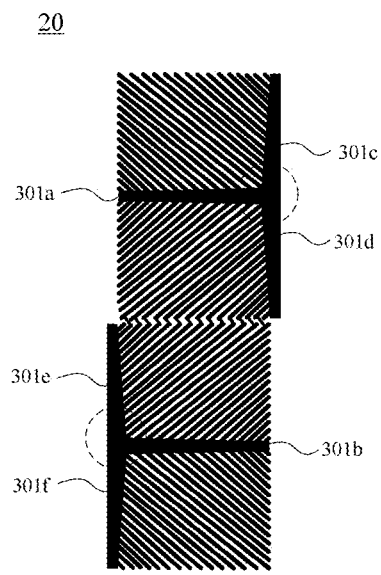
FIGS. 2a to 2d schematically show the structures of a pixel electrode according to embodiments of the present disclosure.
Figure 3:
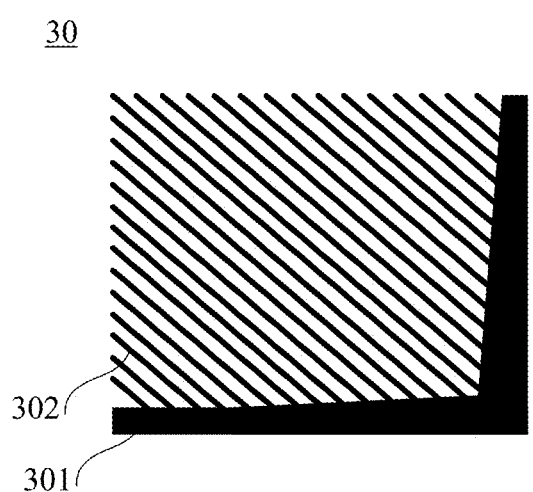
FIG. 3 schematically shows the stricture of an alignment region of the embodiment of the present disclosure.

As shown in FIG. 2a, four alignment regions 30 as described above are arranged in a vertical direction in one pixel electrode 20, wherein the four alignment regions 30 are adjacent to one another from the top down. That is, only horizontal boundaries form between these alignment regions 30, and no vertical boundary forms therebetween. Each of the alignment regions 30 has independent edges in the vertical direction. Further, when the trunk electrodes 301 are provided at both adjacent edges of two adjacent alignment regions 30, the trunk electrodes 301 may be combined into one trunk electrode, such as trunk electrodes 301a and 301b shown in FIG. 2a. The trunk electrodes 301a and 301b are formed by adjacent trunk electrodes of a first alignment region and a second alignment region being combined together, and adjacent trunk electrodes of a third alignment region and a fourth alignment region being combined together, respectively. After respective alignment regions 30 are arranged in a manner as aforementioned, most of the trunk electrodes 301 can be located at peripheral edges of the pixel electrode 20 constituted thereby (i.e., independent edges of the respective alignment regions), such as trunk electrodes 301c, 301d, 301e, and 301f shown in FIG. 2a.

As can be seen from the foregoing analysis, with respect to the pixel electrode 20, when relatively wide trunk electrodes 301 are largely concentrated at the peripheral edges of the pixel electrode 20, to reduce an amount of the trunk electrodes 301 distributed inside of the pixel electrode 20, an area of zero transmittance in the pixel electrode 20 will be reduced, thereby increasing an aperture ratio of a pixel unit. When the trunk electrodes 301 are located at the peripheral edges of the pixel electrode 20, dark areas will be shifted toward the trunk electrodes 301 at the peripheral edges of the pixel electrode 20, so as to reduce dark areas inside of the pixel electrode 20, thereby improving display quality of a liquid crystal display device. In addition, it can be seen from FIG. 2a, a size (length) of the pixel electrode 20 in the vertical direction is larger than a size (width) thereof in the horizontal direction. In the embodiment of the present disclosure, no trunk electrode 301 in the vertical direction is arranged inside of the pixel electrode 20, thereby more effectively restraining dark areas.

In addition, it should be further noted that, in FIG. 2a, since the trunk electrodes 301a and 301b in the horizontal direction are located inside of the pixel electrode 20, it is necessary to attenuate the trunk electrodes 301a and 301b as far as possible, in order to increase the aperture ratio of the pixel unit. However, this will not affect the stability of the pixel electrode 20. The pixel electrode 20 can be stably supported by a cross structure formed by the trunk electrodes 301a, 301c, and 301d, and that formed by the trunk electrodes 301b, 301e, and 301f at the peripheral edges of the pixel electrode 20.

In the embodiment of the present disclosure, the plurality of trunk electrodes 301 have greater width at their perpendicular intersecting points than remainder portions of the trunk electrodes, i.e., each of the trunk electrodes 301 has a maximum width at the perpendicular intersecting point, as shown in areas enclosed by dashed circles in FIG. 2a. Specifically, at the perpendicular intersecting point of the trunk electrodes 301a, 301c, and 301d, the width of each of trunk electrodes is greater than the width of the remainder portions of respective trunk electrode. The same structure is also provided at the intersection of the trunk electrodes 301b, 301e, and 301f.

It is to be noted that, in other embodiments, the widths of the trunk electrodes 301a and 301b may keep unchanged. Since the trunk electrodes 301a and 301b are located inside of the pixel electrode 20, it is a main principle to reduce sizes of the trunk electrodes 301a and 301b in order to improve the aperture ratio of the pixel unit, as described above. On the basis of this, and when stable support can be ensured, the sizes of the trunk electrodes 301a and 301b may be appropriately increased at respective perpendicular intersecting points.

Figure 4A:
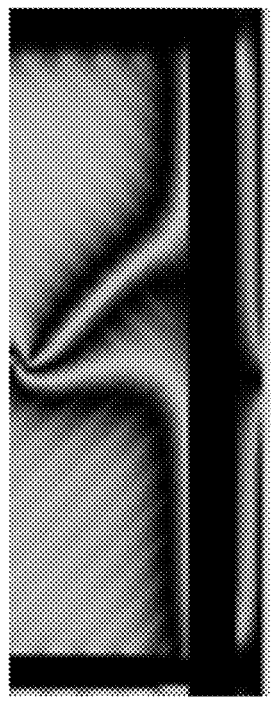
Figure 4B:
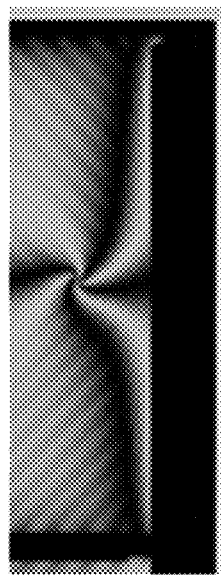

The widths of the trunk electrodes 301 at their perpendicular intersecting point can be appropriately increased to further converge the dark areas generated at the peripheral edges of the pixel electrode 20 toward the perpendicular intersecting point of the plurality of trunk electrodes 301, thereby further reducing the dark areas distributed inside of the pixel electrode 20, and improving the transmittance of the pixel. As shown in FIG. 4, FIG. 4a is a diagram of dark areas generated at the edges of the pixel electrode when the width of each of the trunk electrodes keeps unchanged, and FIG. 4b is a diagram of dark areas generated at the edge of the pixel electrode used in the embodiment of the present disclosure. It can be seen that, when a specific voltage is applied to the pixel electrode 20, since the sizes of the trunk electrodes 301 are large at the perpendicular intersecting point, the strength of an electric field at the perpendicular intersecting point is increased. Under the action of the electric field, liquid crystal molecules are deflected in the direction of the branch electrodes 302 toward the perpendicular intersecting point of the trunk electrodes 301. Meanwhile, the dark areas at the peripheral edges of the pixel electrode 20 are compressed to the perpendicular intersecting point of the trunk electrodes 301, to be further reduced. Therefore, in the embodiment of the present disclosure, the strength of a local electric field is enhanced, so as to facilitate reliable alignment of the liquid crystal molecules, and meanwhile to reduce the dark areas, thereby improving image quality of the liquid crystal display device.

It is to be noted that, the width of each of the trunk electrodes 301c to 301f is preferably gradually reduced along an extending direction thereof, so that the electric field at the peripheral edges of the pixel electrode 20 can be homogeneously changed. Otherwise, abrupt changes in the electric field would cause irregular orientation of the liquid crystal molecules, thereby generating additional dark areas. It is further preferred that, the widths of the trunk electrodes 301a and 301b reach maximum values at positions where the trunk electrodes 301a and 301b connect to the trunk electrodes 301c and 301d, and the trunk electrodes 301e and 301f respectively, and gradually decrease in extension directions thereof.

The specific forms of the branch electrodes 302, such as shape, size, width of intervals therebetween, angle between the branch electrodes and the horizontal direction, may be provided in accordance with alignment requirements of the liquid crystal molecules. This is not limited in the embodiment of the present disclosure. Preferably, the branch electrodes 302 are arranged parallel to each other at equal intervals, and the angle between the branch electrodes 302 and the horizontal direction is 45 degrees or 135 degrees, such that the transmittance of the pixel can reach a maximum value. It is to be understood that changes and modifications made to the corresponding structures described above, without departing from the spirit and substance of the present disclosure, are within the scope of the claims of the present disclosure.

In addition, it can be seen from FIG. 2a, along the vertical direction of the pixel electrode 20, the branch electrodes in the first alignment region and those in the second alignment region together form a shape of the letter K. And the branch electrodes in the third alignment region and those in the fourth alignment region together form a shape of the letter K. The aperture ratio of the pixel unit of the present disclosure can be remarkably improved compared with that of a fish-bone shaped pixel electrode, in which trunk electrodes are arranged in a middle position.

Figure 2B:
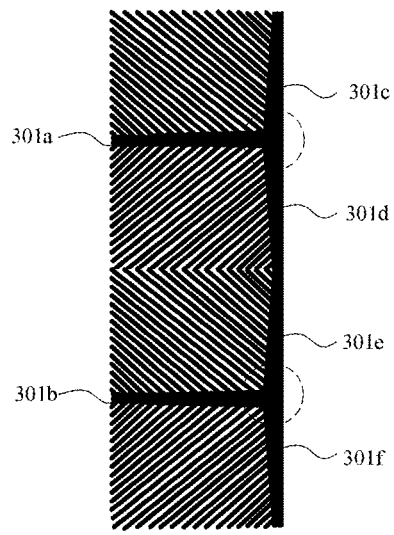
Figure 2C:
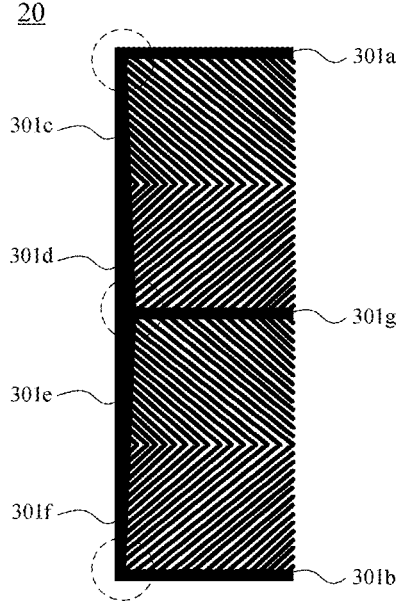
Figure 2D:
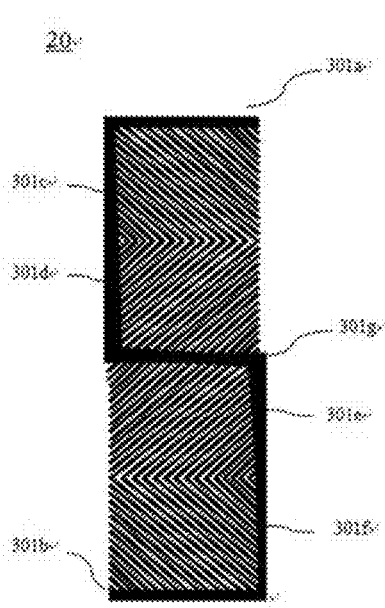

FIGS. 2b to 2d show configuration of the pixel electrode 20 in other embodiments. In FIG. 2b, the trunk electrodes 301c to 301f in the vertical direction are located at the edge of a same side of the pixel electrode 20, and the trunk electrodes 301a and 301b in the horizontal direction are located inside of the pixel electrode 20. The trunk electrodes 301 on one side of the pixel electrode 20 shown in FIG. 2b are formed into an integral whole, so as to achieve stabler support. As can also be seen from FIG. 2b, the branch electrodes 302 between the second alignment region and the third alignment region from the top down are directly connected together, without any trunk electrode 301 being provided therebetween. Hence, the trunk electrodes 301d and 301e keep unchanged in size at a position where they connect to each other. In the present embodiment, the trunk electrodes 301a and 301b are located between adjacent alignment regions. The widths of the trunk electrodes 301a and 301b reach maximum values at positions where the trunk electrodes 301a and 301b connect to the trunk electrodes 301c and 301d, and the trunk electrodes 301e and 301f respectively, and gradually decrease in their extension directions.

In FIG. 2c, the trunk electrodes 301c to 301f in the vertical direction are located at the edge of a same side of the pixel electrode 20 also, and only the trunk electrode 301g of the three trunk electrodes 301a, 301b, and 301g in the horizontal direction is located inside of the pixel electrode 20. Opaque areas of the trunk electrodes 301 inside of the pixel electrode 20 in FIG. 2c are further reduced as compared with those in the structure of the pixel electrode in the foregoing embodiment, thereby improving the aperture ratio of the pixel unit. At the same time, the trunk electrodes 301 on one side of the pixel electrode 20 shown in FIG. 2c are formed into an integral whole, which is connected to the trunk electrodes 301a and 301b at a top edge and a bottom edge of the pixel electrode 20, respectively, to form into an integral whole also. This not only reduces opaque areas inside of the pixel electrode 20, but realizes a stabler support structure.

Similarly, since the branch electrodes 302 in the first alignment region are directly connected to the branch electrodes 302 in the second alignment region, and the branch electrodes 302 in the third alignment region are directly connected to the branch electrodes 302 in the fourth alignment region, the trunk electrodes 301c and 301d, and the trunk electrodes 301e and 301f keep unchanged in size at intersections therebetween. That is, no widening process is performed. It should also be noted that the perpendicular intersecting point of the trunk electrodes 301a and 301c of the first alignment region is located at an apex of the pixel electrode 20, as shown in an area enclosed by a dashed line in FIG. 2c. In the present embodiment, the trunk electrodes 301a and 301b can be configured to have varying or constant widths in their extension directions. This can be adjusted according to actual display effects. And the width of the trunk electrode 301g located between two adjacent alignment regions has a maximum value at a position where the trunk electrode 301g connects to the trunk electrodes 301d and 301e, and gradually decreases along the extension direction of the trunk electrode 301g. Of course, the trunk electrode 301g may be arranged in accordance with a main principle that the size thereof is reduced in such a manner as how the trunk electrodes 301a and 301b in FIG. 2a are arranged. The structure of the pixel electrode 20 in FIG. 2d is also able to ensure a stable support and to increase the aperture ratio of the pixel unit. The main trunk electrodes are arranged in a similar manner to that indicated in FIG. 2c, which will not be described herein.

In the present embodiment, it is necessary to emphasize that the trunk electrode 301g located between adjacent alignment regions is connected, at its two ends, to the trunk electrode 301d on a left side and the trunk electrode 301e at a right side, respectively. The width of the trunk electrode 301g is relatively large at positions where the trunk electrode 301g connects to the trunk electrodes 301d and 301e, and is gradually reduced from both ends to middle portions in its extension directions (i.e., the horizontal direction in FIG. 2).

Further, when the pixel electrode 20 is formed through arrangement of the alignment regions 30, it is preferred that the trunk electrodes 301 be located at the peripheral edges of the pixel electrode 20, in order to reduce the opaque area inside of the pixel electrode 20. This will help to improve the aperture ratio of the pixel unit, and restrains generation of dark areas. Specifically, in the embodiments of the present disclosure, no more than two trunk electrodes are provided at connecting positions between the respective alignment regions 30 (i.e., in the horizontal direction), and there is no trunk electrode in the vertical direction being provided inside of the alignment regions 30.

In other embodiments of the present disclosure, an array substrate having the above-described pixel electrode structure is further provided. Specifically, a plurality of pixel units are arranged on the array substrate, and one pixel electrode 20 is provided in each of the pixel units. This will not be described here. The array substrate with the above-described structure enables an improved aperture ratio of the pixel unit, reliably aligned liquid crystal molecules, reduced dark areas, and improved display effects.

While the embodiments of the present disclosure are described above, the description should not be construed as limitations of the present disclosure, but merely as embodiments for readily understanding the present disclosure. Anyone skilled in the art, within the spirit and scope of the present disclosure, can make amendments or modification to the implementing forms and details of the embodiments. Hence, the scope of the present disclosure should be subject to the scope defined in the claims.

The invention claimed is:

1. A pixel electrode, which is divided into four alignment regions, and each of the alignment regions includes two perpendicularly intersecting trunk electrodes and a plurality of branch electrodes,
wherein the trunk electrodes are arranged along a horizontal direction and a vertical direction respectively, and the trunk electrodes along the vertical direction are located at independent edges of respective alignment regions;
wherein the branch electrodes extend radially from a perpendicular intersecting point of the trunk electrodes;
wherein each of the trunk electrodes has a maximum width at the perpendicular intersecting point of the trunk electrodes; and
wherein a boundary between a second alignment region and a third alignment region, and independent edges of a first alignment region and a fourth alignment region are respectively provided with the trunk electrodes in the horizontal direction,
wherein the four alignment regions are arranged along the vertical direction.

2. The pixel electrode according to claim 1, wherein the trunk electrodes in the horizontal direction are arranged along boundaries between the alignment regions.

3. The pixel electrode according to claim 2, wherein no more than two trunk electrodes are arranged along the boundaries between the alignment regions.

4. The pixel electrode according to claim 1, wherein at least one of the trunk electrodes gradually decreases in width along an extending direction thereof.

5. The pixel electrode according to claim 1, wherein the branch electrodes are arranged parallel to one another at equal intervals.

6. The pixel electrode according to claim 5, wherein an angle formed between the branch electrodes and the horizontal direction is 45 degrees or 135 degrees.

7. An array substrate, comprising a plurality of pixel units, each of which is provided with one pixel electrode therein, wherein the pixel electrode is divided into four alignment regions, and each of the alignment regions includes two perpendicularly intersecting trunk electrodes and a plurality of branch electrodes,
wherein the trunk electrodes are arranged along a horizontal direction and a vertical direction respectively, and the trunk electrodes along the vertical direction are located at independent edges of respective alignment regions,
wherein the branch electrodes extend radially from a perpendicular intersecting point of the trunk electrodes,
wherein each of the trunk electrodes has a maximum width at the perpendicular intersecting point of the trunk electrodes, and
wherein two ends of a trunk electrode along the horizontal direction are respectively connected to the trunk electrodes along the vertical direction, and a width of the trunk electrode along the horizontal direction is largest at positions where the trunk electrode along the horizontal direction connects to the trunk electrodes along the vertical direction, and gradually decreases from the two ends to a middle position of the trunk electrode along the horizontal direction, respectively.

8. The array substrate according to claim 7, wherein at least one of the trunk electrodes gradually decreases in width along an extending direction thereof.

* * * * *